United States Patent [19]

Okino

[11] Patent Number: 4,953,679

[45] Date of Patent: Sep. 4, 1990

[54] SLIP CONTROL SYSTEM FOR LOCK-UP CLUTCH OF AUTOMATIC TRANSMISSION

[75] Inventor: Yoshinori Okino, Hiroshima, Japan

[73] Assignee: Mazda Motor Corporation, Hiroshima, Japan

[21] Appl. No.: 293,689

[22] Filed: Jan. 5, 1989

[30] Foreign Application Priority Data

Jan. 12, 1988 [JP] Japan ................................. 63-5336

[51] Int. Cl.⁵ ..................... B60K 41/02; F16D 47/06
[52] U.S. Cl. ................................. 192/0.096; 192/3.3
[58] Field of Search ................ 192/0.096, 3.29, 3.3, 192/3.31; 364/424.1, 431.01, 431.03, 431.05; 123/340

[56] References Cited

U.S. PATENT DOCUMENTS

| | | | |
|---|---|---|---|
| 4,422,353 | 12/1983 | Suga et al. | 74/866 |
| 4,473,882 | 9/1984 | Suzuki et al. | 192/3.31 |
| 4,580,671 | 4/1986 | Matsuoka et al. | 192/0.076 |
| 4,618,041 | 10/1986 | Sotoyama et al. | 192/0.044 |
| 4,669,441 | 6/1987 | Okimoto | 123/559 |
| 4,687,083 | 8/1987 | Sotoyama et al. | 192/0.076 |
| 4,763,264 | 8/1988 | Okuno et al. | 364/431.01 |

FOREIGN PATENT DOCUMENTS

| | | | |
|---|---|---|---|
| 57-33253 | 2/1982 | Japan . | |
| 0062765 | 4/1984 | Japan | 192/3.29 |
| 0200862 | 11/1984 | Japan | 192/3.3 |
| 0106174 | 5/1987 | Japan | 192/3.3 |

Primary Examiner—Leslie A. Braun
Assistant Examiner—Andrea Pitts
Attorney, Agent, or Firm—Fleit, Jacobson, Cohn, Price, Holman & Stern

[57] ABSTRACT

A slip control system for an automatic transmission of vehicle having fuel cut device for interrupting a fuel supply in a fuel cut zone, including a torque converter, lock-up clutch means provided comprising slip control device for controlling an engaging force of the lock-up clutch ranged from a lock-up condition in which a rotation speed of the input member of the torque converter is substantially the same as the output member of the torque converter to a slip condition in which a predetermined rotation speed difference is produced between the input member and output member, transient control device for controling the engaging force of the lock-up clutch for a predetermined period in connection with a switching operation in the fuel cut device between a fuel supply condition and a fuel cut condition for the engine at a predetermined value between the slip condition and a converter condition in which the lock-up clutch is fully released.

8 Claims, 8 Drawing Sheets

SLIP CONTROL SYSTEM FOR LOCK-UP CLUTCH OF AUTOMATIC TRANSMISSION

CROSS-REFERENCE TO THE RELATED APPLICATION

This application relates to U.S. patent application Ser. No. 250,603 filed on Sept. 29, 1988 by Fumiaki Baba et al entitled "LOCK-UP CONTROL SYSTEM FOR AUTOMATIC TRANSMISSON".

BACKGROUND OF THE INVENTION

1. Field of the Invention

The present invention relates to a torque converter for an automatic transmission of an automotive vehicle, more specifically to a slip control system for a lock-up clutch provided in the torque converter.

2. Description of the Prior Art

In a field of a torque converter incorporated to an automatic transmission of an automotive vehicle, there has been proposed a lock-up clutch for providing a direct connection between engine output member and input member of the transmission under a predetermined engine operating condition in which there is no amplification of a torque, or no change in torque from an engine so that a fuel consumption performance of the vehicle is improved.

Meanwhile, in a fuel control for the engine, a fuel cut control in which a fuel supply for the engine is interrupted is carried out for saving a fuel consumption under a predetermined engine operating condition, such as a decelerating condition of the vehicle.

Further, in the fuel control of a vehicle provided with the lock-up clutch for the torque converter of the automatic transmission, there has been known a slip control for the lock-up clutch wherein the lock-up clutch is controlled to produce a certain slippage between an input and output members thereof in such a decelerating condition and a fuel cut condition to prevent the engine speed from an abrupt reduction so that the fuel cut control can be maintained as long as possible for improving the fuel consumption performance.

Japanese Patent Public Disclosure No. 57-33253 (corresponding to U.S. Pat. No. 4,468,988) laid open to the public in 1982, discloses a slip control system for a lock-up clutch of a torque converter wherein respective rotation speeds of an input and output members of the torque converter are detected and a hydraulic pressure for controlling the lock-up clutch is controlled to converging a rotation speed difference between the input and output members to a predetermined value by means of a feedback control.

U.S. Pat. Nos. 4,580,671, 4,618,041, 4,669,441, 4,687,083 disclose conventional transmission control systems respectively.

In the slip control of the lock-up clutch, in the case where the vehicle is caused to be re-accelerated, the fuel supply is restored and the lock-up clutch is disengaged for utilizing the torque converter. It is disadvantageous that this operation of disengagement of the lock-up clutch causes a torque shock to deteriorate a riding comfort.

Specifically, this problem is produced in such a slight re-accelerating condition that a stroke of an accelerator pedal is slightly increased for maintaining a constant vehicle speed. This problem also occurs at a time when the fuel supply resumes when the engine speed is lowered because of the fuel cut control to a predetermined value for restoring the fuel supply.

SUMMARY OF THE INVENTION

It is therefore an object of the present invention to provide a slip control system for a lock-up clutch of a torque converter in which a torque shock can be eased at the time of fuel resumption.

It is another object of the present invention to provide a engine control system providing an improved fuel consumption performance by executing a fuel cut control for the engine.

The above and other objects of the present invention can be accomplished by in a slip control system for an automatic transmission of an automotive vehicle having fuel cut means for interrupting a fuel supply to an engine when an engine operating condition is in a predetermined fuel cut zone, including a torque converter disposed between the engine and the automatic transmission for controlling an amount of a torque transmitted from the engine to the transmission, lock-up clutch means provided in the torque converter for connecting an input and output members of the torque converter directly, the improvement comprising slip control means for controlling an engaging force of the lock-up clutch means ranged from a lock-up condition in which a rotation speed of the input member of the torque converter is substantially the same as the output member of the torque converter to a slip condition in which a predetermined rotation speed difference is produced between the input member and output member of the torque converter, transient control means for controlling the engaging force of the lock-up clutch means for a predetermined period after a switching operation in said fuel cut means between a fuel supply condition and a fuel cut condition for the engine at a predetermined value between the slip condition and a converter condition in which the lock-up clutch means is fully released.

In the vehicle decelerating condition in which the fuel cut means is turned on to interrupt the fuel supply to the engine, the lock-up clutch can be maintained at the slip condition. Alternatively, the lock-up clutch can be maintained at the lock-up condition at a certain engine operating condition in which a fuel cut control is stably maintained.

The above and other features of the present invention will be apparent from the following description taking reference to the accompanying drawings.

DESCRIPTION OF THE PREFERRED EMBODIMENT

Figure 1:
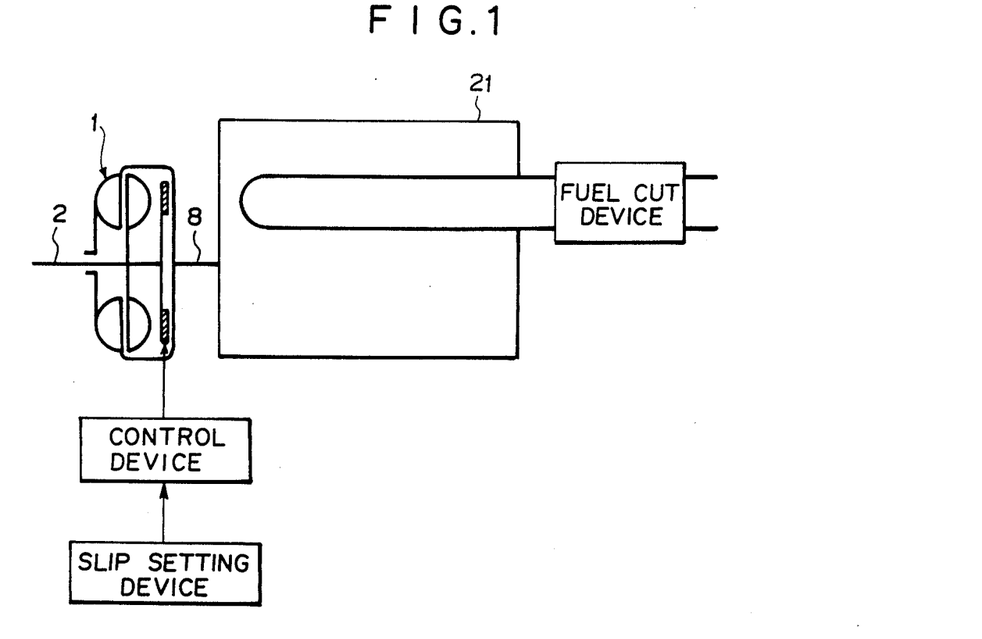
FIG. 1 is a schematic view of a slip control system in accordance with the present invention.
Figure 2:
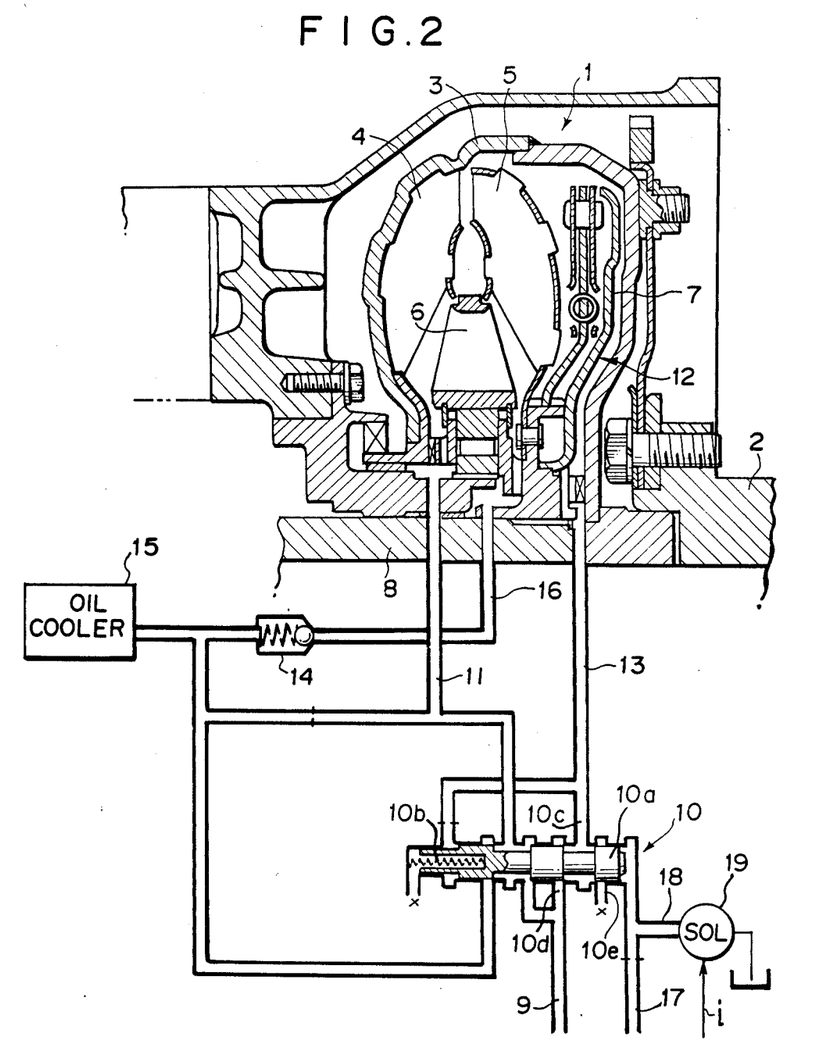
FIG. 2 is a sectional view showing a torque converter and a hydraulic circuit.

Referring to the drawings, specifically to FIG. 1 and 2, an engine 21 is provided with a fuel cut device for interrupting a fuel supply to the engine 21 when an engine operating condition is in a decelerating zone in which a vehicle is decelerated. A torque converter 1 is provided with a lock-up clutch 7 for directly connecting an engine output shaft 2 or an input member of the torque converter 1 and a turbine shaft 8 or an output member of the torque converter 1. There is provided a slip setting device for setting an amount of a slip in the lock-up clutch between the input and output members 2, 8 and a control device for controlling the amount of the slip to a predetermined value. As shown in FIG. 2, the torque converter 1 is further provided with a pump 4 mounted on one side of a case 3 fixed to the shaft 2 for rotating together with the shaft 2, a turbine 5 facing the pump 4 and rotatably mounted on the other side of the case 3 for being driven by the pump 4 through a hydraulic oil, and a stator 6 disposed between the pump 4 and the turbine 5 for amplifying the torque when a speed ratio of the turbine 5 to the pump 4 is smaller than a predetermined value. The rotation of the turbine is transmitted to a shift gear mechanism (not shown) through the turbine shaft 8. When the lock-up clutch 7 connected with the turbine shaft 8 is engaged with the case 3, the turbine shaft 8 is directly or rigidly connected with the engine output shaft 2 through the case 3 and the lock-up clutch 7.

A hydraulic pressure of the hydraulic oil is introduced into the torque converter 1 from an oil pump (not shown) through a main line 9, a lock-up valve 10 and a converter-in line 11 so that a hydraulic pressure urges the lock-up clutch 7 to be brought into engagement. The clutch 7 and the case 3 defines an oil chamber 12 with which the lock-up valve 10 is communicated through a lock-up release line 13. When the hydraulic pressure is introduced into the chamber 12, the lock-up clutch 7 is disengaged from the case 3. The torque converter 1 is connected with a converter-out line 16 for introducing the hydraulic oil to an oil cooler 15 through a check valve 14 which keeps a predetermined hydraulic pressure in the chamber 12.

The lock-up valve 10 is provided with a spool 10a and a spring 10b for urging the spool 10a to the right in FIG. 2 and formed with a port 10c connected with the lock-up release line 13, a pressure regulating port 10d located at one side of the port 10c and connected with the main line 9 and a drain port 10e located at the other side of the port 10c. To the right end of the lock-up valve 10 in FIG. 2 is connected a control line 17 for introducing a pilot hydraulic pressure to the spool 10a. There is provided a duty solenoid valve 19 on a drain line 18 which is separated from the control line 17. The solenoid valve 19 controls an opening of the drain line 18 continuously in accordance with a signal of a duty ratio to thereby control the pilot pressure in the control line 17 to a value corresponding to the duty ratio. The pilot pressure is applied to the spool 10a of the lock-up valve 10 against a resilient force of the spring 10b. The spool 10a is also subjected to a hydraulic pressure from the lock-up release line 13 in the same direction as the resilient force of the spring 10b. Thus, the spool 10a moves in accordance with a sum of the resilient and hydraulic forces acting thereon so that the lock-up release line 13 is communicated with the drain port 10e or the main line 9 through the pressure regulating port 10d. As the duty ratio of the signal introduced in the solenoid valve 19 is increased, namely ON-time of one ON-OFF cycle is increased, the quantity of the hydraulic oil for draining through the control line 17 is decreased so that the pilot pressure or the pressure in the release line 13 is increased. As a result, the lock-up clutch is urged to be released. The maximum value of the duty ratio causes an entire disengagement of the lock-up clutch 7 resulting in no torque transmitting through the clutch 7. This means all the engine torque is transmitted through the toque converter 1. On the contrary, as the duty ratio is decreased, the quantity of the draining is increased to cause a reduction of the pilot pressure so that the lock-up clutch 7 is controlled to be engaged. Eventually, the minimum value of the duty ratio establish a full engagement of the lock-up clutch 7. This means all the engine torque is transmitted the transmission gear mechanism 4 through the lock-up clutch 7. When the duty ratio takes a value between the maximum and the minimum values, the lock-up clutch 7 produces a certain amount of slippage in an engaging surface between the lock-up clutch 7 and the case 3. An amount of the slippage is controlled in accordance with the duty ratio.

Figure 3:
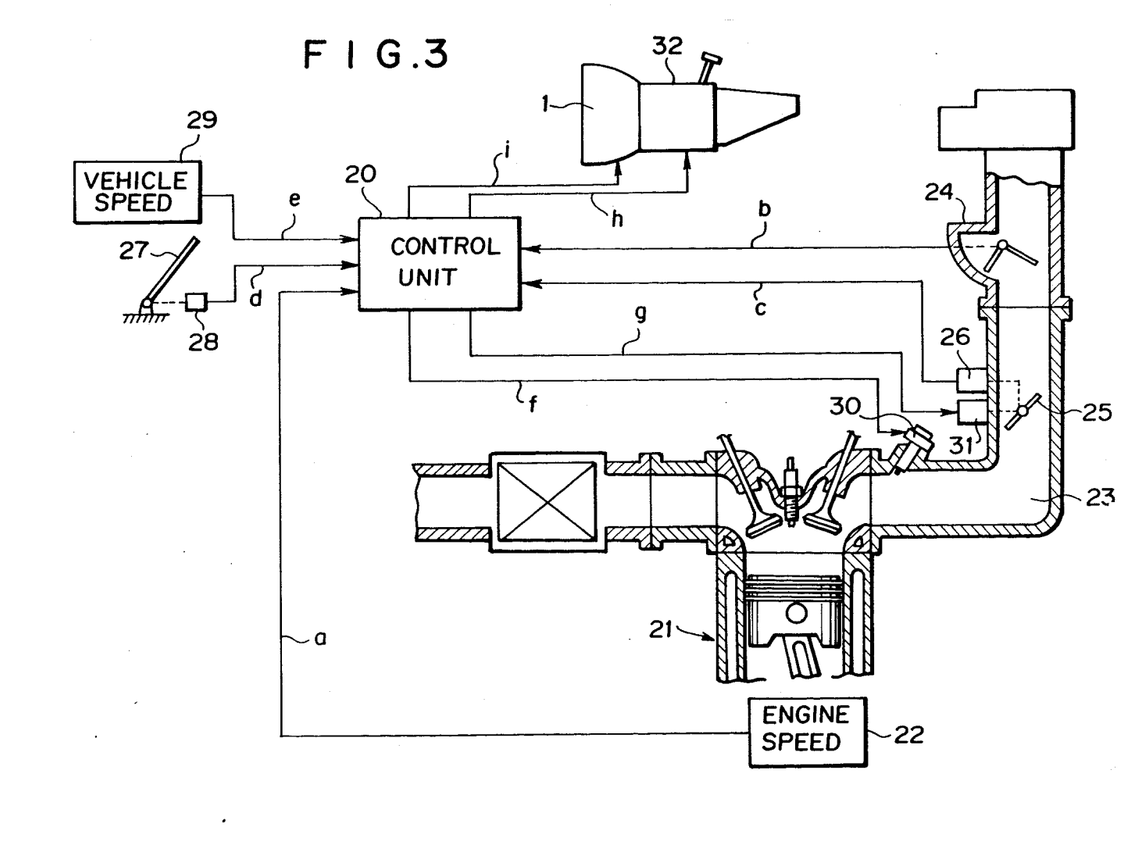
FIG. 3 is a schematic view showing a relationship between a control unit and various sensors.

Hereinafter, there is described a control system of the automatic transmission including the lock-up clutch 7 and a fuel supply system with reference to FIG. 3.

The control system comprises a control unit 20 which receives an engine speed signal a from a speed sensor 22 for detecting a rotation speed of the engine 21, an air flow signal b from an air flow meter 24 disposed at an upstream portion of an intake passage 23, a throttle signal c from a throttle sensor 26 disposed at a downstream portion of the intake passage 23 for detecting a throttle valve opening, an acceleration signal d from an acceleration sensor for detecting a stroke applied to an accelerator pedal, and a vehicle speed signal e from a vehicle speed sensor 29. The control unit 20 produces a fuel signal f to a fuel injector 30 which controls a fuel supply to the engine 21, a throttle control signal g to an actuator 31 for electrically controlling the throttle valve 25, a shift control signal h to a control valve unit (not shown) for controlling gear stages of an automatic transmission 32 and a lock-up control signal i to the duty solenoid valve 19 for controlling the engaging condition of the lock-up clutch 7.

Figure 4:
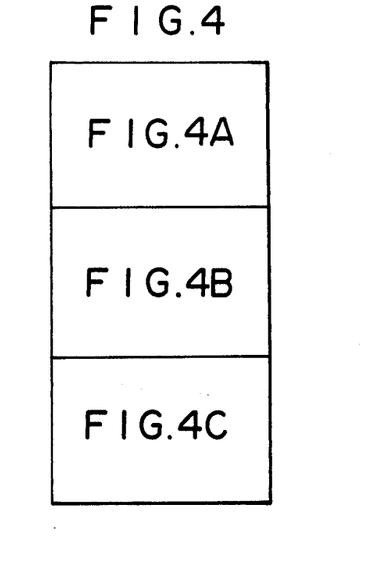
FIGS. 4, 4A, 4B and 4C show a flow chart of a lock-up control.
Figure 4A:
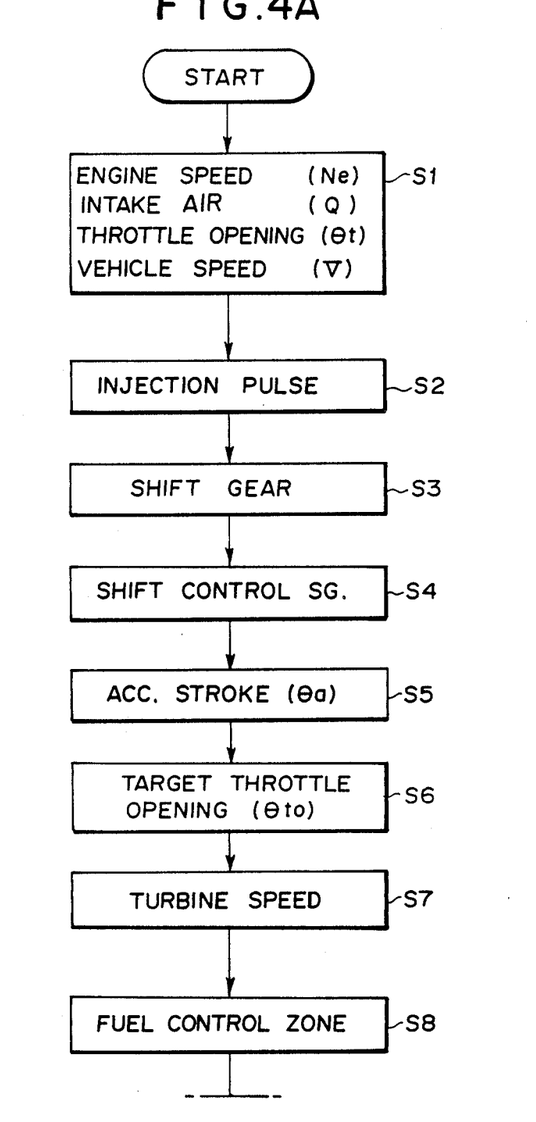
Figure 4B:
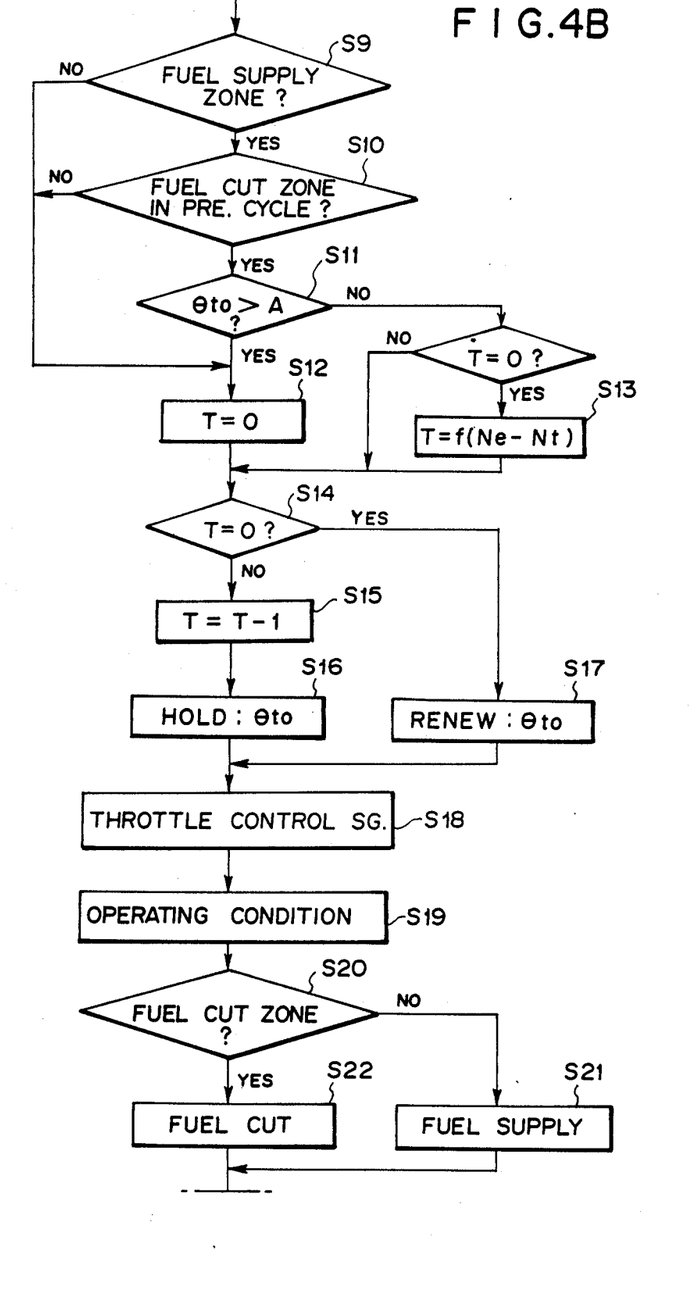
Figure 4C:
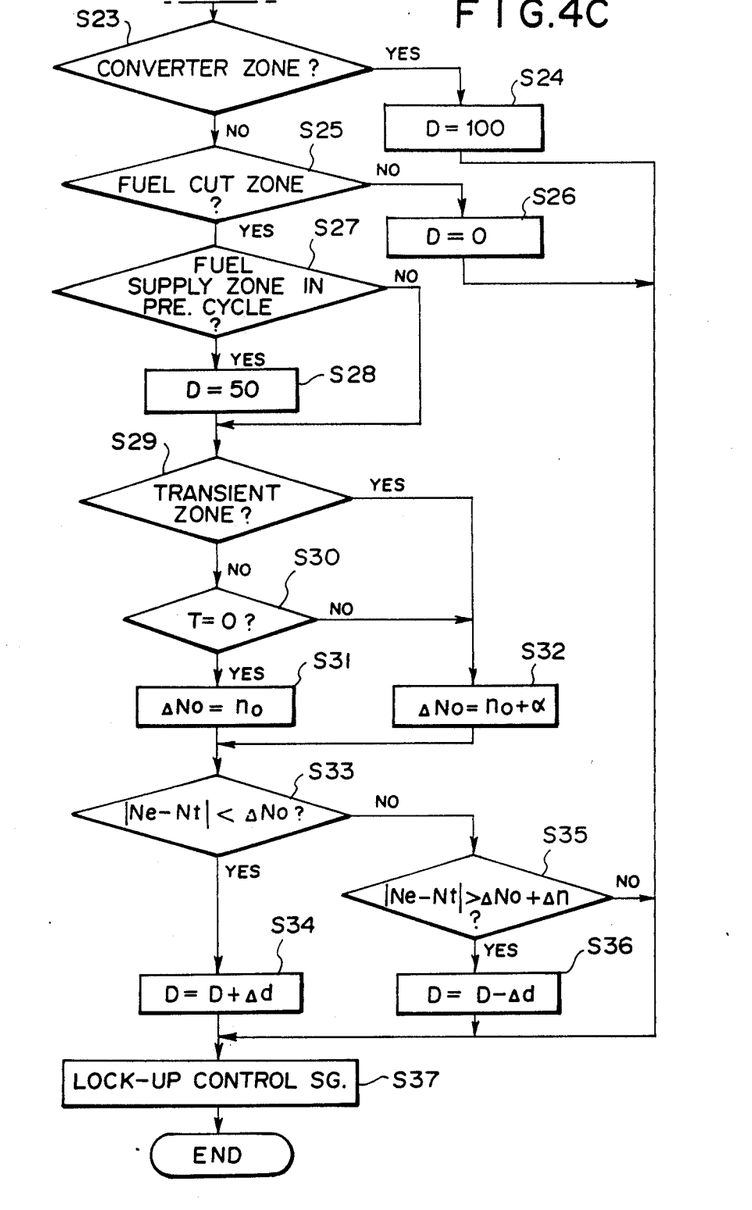

In operation, as shown in FIG. 4, the control unit 20 receives signals denoting an engine speed Ne, a quantity of the intake air Q, the throttle opening $\Theta t$, the vehicle speed V based on the signals, a, b, c and e (S1). Thereafter, the control unit 20 calculates a injection pulse corresponding to a quantity of a fuel injection from the injector 30 based on the quantity of the intake air Q (S2). In steps S3, S4, the control unit 20 determines an optimum gear stage of the transmission 32 based on a shift pattern map stored in the unit 20 in light of the values of the throttle opening $\Theta t$ and the vehicle speed V and produces the shift control signal h to the automatic transmission 32 so that the shift control is made in accordance with a vehicle operating condition.

Figure 7:
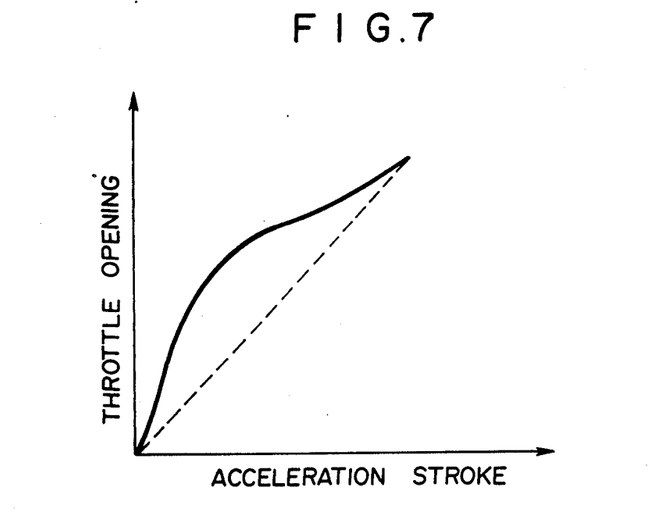
FIG. 7 is a graphical representation of a relationship between a throttle opening and an acceleration stroke.

The control unit 20 receives the acceleration stroke $\Theta a$ based on the signal d and determines a target throttle opening $\Theta t_0$ in light of a throttle property map prepared in the control unit 20 as shown in FIG. 7 (S5, S6) and calculates a turbine speed Nt based on the gear stage of the transmission selected by the control unit 20 and vehicle speed V (S7).

Figure 5:
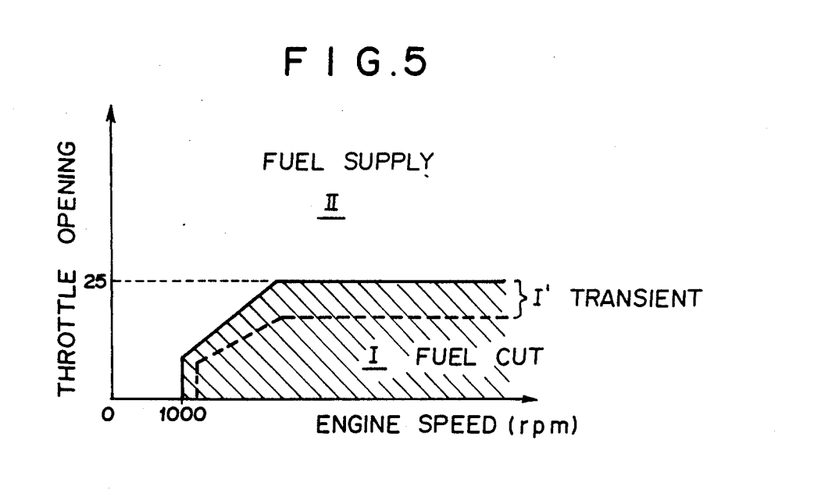
FIG. 5 is a graphical representation showing a fuel supply control zone.

In next, the control unit 20 judges the engine operating condition with regard to a fuel control zone based on the engine speed Ne and target throttle opening $\Theta t_0$. More specifically, the control unit 20 is provided with a map defined the engine speed Ne and the target throttle opening $\Theta t_0$ as shown in FIG. 5 wherein a fuel cut zone I and a fuel supply zone II are provided in accordance with the engine speed Ne and the target throttle opening $\Theta t_0$. The fuel cut zone I is roughly provided when the engine speed Ne is more than a predetermined value and the target throttle opening $\Theta t_0$ is smaller than a predetermined value as shown by a hatched portion as defined by a real line in FIG. 5 (S8).

In the case where the control unit 20 judges that the engine operating condition is in the fuel cut zone I in the preceding cycle and is in the fuel supply zone II in the current cycle, that is, where an increase of the acceleration stroke $\Theta a$ causes an increase in the target throttle opening $\Theta t_0$ to transfer the engine operating condition from the zone I to zone II (S9, S10), the control unit 20 further judges whether or not the target throttle opening $\Theta t_0$ is greater than a predetermined value A (for example 30%) (S11). When this judgement is Yes, that is, the engine is in an abrupt accelerating condition, the control unit 20 provides a timer in the control unit with a value 0 because a torque shock of the vehicle is not serious under such abrupt accelerating condition. The control unit 20 provides the timer T with the value of 0 when the engine operating condition in the current cycle is in the same fuel zone as in the preceding cycle.

Meanwhile, where the target throttle opening $\Theta t_0$ is smaller than the predetermined value A, that is, where the engine operating condition is in a slight acceleration condition in which the torque shock would affect to deteriorate the riding comfort, the control unit sets an initial value of the timer T at a value f(Ne−Nt) (S13) after confirming that the timer is currently T=0.

Figure 6:
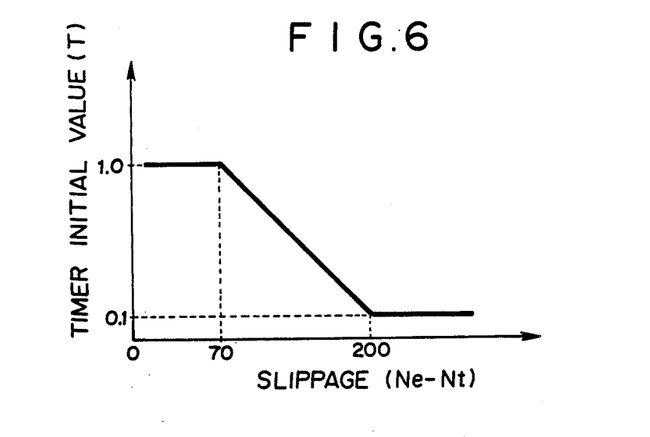
FIG. 6 is a graphical representation for providing a timer set period based on a slippage in a lock-up clutch.

The initial value of the timer T is determined based on the amount of the slippage in the torque converter 1 provided as a value (Ne−Nt) as shown in FIG. 6 wherein the initial value of the timer T is increased as a function f(Ne−Nt) of the amount of the slippage or speed difference between the pump 4 and turbine 5 (Ne−Nt) is decreased, that is, as the engaging condition of the lock-up clutch 7 approaches the lock-up condition.

As a result, the value of the target throttle opening $\Theta t_0$ is maintained at the same value obtained in the preceding cycle until the timer T expires (S14, S15 and S16). After expiration of the timer T, the control unit 20 sets the target throttle opening $\Theta t_0$ at a value obtained in the current cycle (S17) and produces a throttle control signal g to the actuator 31 so that an actual throttle opening $\Theta t$ is controlled to the target throttle opening $\Theta t_0$ (S18).

In this control, when the engine 21 is in the slight acceleration condition, the target throttle opening $\Theta t_0$ is maintained at the actual throttle opening $\Theta t$ in the fuel cut zone I regardless of the increase of the acceleration stroke $\Theta a$ until the timer T expires.

In step 19, 20, the control unit 20 judges whether or not the engine operating condition is in the fuel cut zone based on the actual throttle opening $\Theta t$ and the engine speed Ne. When the engine operating condition is in the fuel supply zone II, the control unit 20 produces a fuel control signal f for a injection pulse (S21). When in the fuel cut zone I, the control unit 20 produces a control signal f for interrupting the fuel supply (S22).

The control unit 20 judges whether or not the engine operating condition is in a converter zone in which the lock-up clutch 7 is fully released or disengaged (S23). If the judgement is Yes, the control unit 20 sets the duty ratio D for the valve 19 at a value of 100% (S23). If No, the control unit 20 sets the duty ratio at a value of 0% (S25, S26).

When the engine operating condition is not in the converter zone and in the fuel cut zone I, the control unit 20 judges whether or not the engine operating condition was in the fuel supply zone in the preceding cycle to judge whether or not the engine operating condition is changed from the fuel supply zone II to the fuel cut zone in the current cycle for the first time (S27). If the judgment in step S27 is Yes, the control unit 20 provides the duty ratio with a value of 50% (S28).

In next step S29, the control unit 20 judges whether or not the engine operating condition is in a transient zone I′ provided within the fuel cut zone I and adjacent to the fuel supply zone II wherein the transient zone I′ is provided as a zone defined by the real line and a broken line in FIG. 6. As described later, in the transient zone I′, a greater value of the slippage of the lock-up clutch 7 is provided for easing the torque shock induced by a change in the engine operating condition. Therefore, the broken line in FIG. 6 defines the transient zone I′ in which a relatively greater target slippage quantity $N_0$ is provided and the fuel cut zone I in which a relatively smaller target slippage quantity $N_0$ is provided.

When the timer T has the value of 0 in the case where the engine operating condition is not in the transient zone I′, the control unit 20 sets a target slippage quantity $N_0$ in the lock-up clutch or the speed difference between the pump 4 and turbine 5 at a predetermined value $n_0$ (for example, $n_0 = 70$ rpm in the illustrated embodiment) in the in steps S30, S31.

On the other hand, when the engine operating condition is in the transient zone I′, or before expiration of the timer T even when the engine operating condition is not in the transient zone I′, that is, when the engine 21 is in the slight accelerating condition wherein the engine operating condition has been changed from the zone I to the zone II and the target throttle opening $\Theta t_0$ is maintained at the precedent value regardless of a change in the acceleration stroke, the control unit 20 provides the target slippage quantity $N_0$ with a predetermined value of $n_0 + \alpha$ (for example, $n_0 + \alpha = 200$ rpm in the illustrated embodiment)(S32). In step 33, the control unit 20 compares the target slippage quantity $N_0$ with the actual slippage quantity shown by an absolute value of (Ne−Nt) and adds a compensating value d to the duty ratio D when the actual slippage quantity is smaller than the target slippage quantity $N_0$ in step S34. On the other hand, when the actual slippage quantity is greater than a value obtained by adding a predetermined value n for a dead band to the target slippage quantity $N_0$, the control unit 20 subtracts the compensating value d from the duty ratio D. This compensating value d is usually provided as about a value of 1%. Then, the control unit 20 produces the control signal i corresponding to the final value of the duty ratio D to the solenoid valve 19 (S37).

According to the above control, the lock-up clutch 7 is fully released in the converter zone as a result that the duty ratio D is set at a value of 100%. When the engine operating condition is not in the converter zone and not in the fuel cut zone I, the lock-up clutch 7 is fully engaged as a result of the duty ratio of 0%. Further, when the engine operating condition is not in the converter zone and in the fuel cut zone, the lock-up clutch 7 is controlled so as to converge the actual slippage quantity of the lock-up clutch 7 to the target slippage quantity $N_0$ by controlling the duty ratio D by means of a feedback control for the slippage quantity (Ne−Nt) as described above.

In the slip control, the slippage quantity is controlled to a greater value by the value of α when the engine operating condition is in the transient zone I' so that the lock-up clutch 7 has the greater value of slippage in the transient zone I'. This means that there is provided the greater value of the slippage in the lock-up clutch 7 whenever the control zone for the lock-up clutch 7 is changed between the converter zone and the slip zone, and between the lock-up zone and the slip zone in the case where the engine operating condition is changed between the fuel cut zone I and the fuel supply zone II.

Therefore, the torque shock induced by a change in the fuel control can be eased effectively.

Further, whenever the engine 21 is in a slight accelerating condition in the case where the engine operating condition is not in the transient zone I', the slip control is made to provide the lock-up clutch 7 with a greater slippage for the predetermined period set by the timer T so that the torque shook can be eased in the slight accelerating condition as well to maintain a better riding comfort.

It will be apparent from that many modifications and variations may be made based on the above descriptions by those skilled in the art without departing from the scope of the claims as attached.

I claim:

1. In a slip control system for an automatic transmission of an automotive vehicle having fuel cut means for interrupting a fuel supply to an engine when an engine operating condition is in a predetermined fuel cut zone, including a torque converter disposed between the engine and the automatic transmission for controlling an amount of a torque transmitted from the engine to the transmission, lock-up clutch means provided in the torque converter for connecting an input and output member of the torque converter directly, the improvement comprising slip control means for controlling an engaging force of the lock-up clutch means to accomplish a slip condition in which a predetermined rotation speed difference is produced between the input member and output member of the torque converter, the slip condition being defined as an intermediate condition between a lock-up condition in which a rotation speed of the input member of the torque converter is substantially the same as a rotation speed of the output member thereof and a converter condition in which the lock-up clutch means is fully released, transient control means for controlling the engaging force of the lock-up clutch means to accomplish a target rotation speed difference between said input member and said output member greater than said predetermined rotation difference in the slip condition when the engine operating condition is a transient zone included in the fuel cut zone and adjacent to a fuel supply zone in which a fuel is supplied for the engine.

2. In a slip control system in accordance with claim 1 wherein the improvement further comprises throttle control means for controlling an opening of a throttle valve to a target value, the throttle control means maintaining the target value at a value obtained in an engine operating condition just before said engine operating condition moves from the fuel cut zone to the fuel supply zone as said transient control means controls the engaging force of the lock-up clutch means to accomplish the target rotation speed difference.

3. In a slip control system in accordance with claim 1 wherein the improvement comprises an engaging force changing means for changing said engaging force of the lock-up clutch means between a first transient condition in which said engine operating condition moves from the fuel supply zone to the fuel cut zone and a second transient condition in which said engine operating condition moves from the fuel cut zone to the fuel supply zone.

4. In a slip control system in accordance with claim 1 wherein said transient control means controls the engaging force of the lock-up clutch means to produce a slippage therein greater than a slippage in said slip condition for a period determined based on the speed difference between the input and output members whenever the engine operating condition moves from the fuel cut zone to the fuel supply zone regardless of a time period when the engine operating condition is in said transient zone.

5. In a slip control system in accordance with claim 4 wherein said transient control means controls the engaging force of the lock-up clutch means to produce a slippage therein greater than a slippage in said slip condition for only a time period when the engine operating condition is in said transient zone in the case where the engine operating condition moves from the fuel supply zone to the fuel cut zone.

6. In a slip control system in accordance with claim 4 wherein the improvement comprises abrupt acceleration detecting means for detecting an abrupt accelerating condition of the vehicle, a control for the lock-up clutch means provided by the transient control means being restricted when the abrupt accelerating condition is detected.

7. In a slip control system in accordance with claim 4 wherein said predetermined period is determined based on a function of the rotation difference between the input and output members of the torque converter and controlled by timer means.

8. In a slip control system for an automatic transmission of an automotive vehicle having fuel cut means for interrupting a fuel supply to an engine when an engine operating condition is in a predetermined fuel cut zone, including a torque converter disposed between the engine and the automatic transmission for controlling an amount of a torque transmitted from the engine to the transmission, lock-up clutch means provided in the torque converter for connecting an input and an output member of the torque converter directly, the improvement comprising slip control means for controlling an engaging force of the lock-up clutch means to accomplish a slip condition in which a predetermined rotation speed difference is produced between the input member and output member of the torque converter, the slip condition being defined as an intermediate condition between a lock-up condition in which a rotation speed of the input member of the torque converter is substantially the same as the output member thereof and a converter condition in which the lock-up clutch means is fully released, transient control means for controlling the engaging force of the lock-up clutch means to accomplish a target rotation speed difference between said input member and said output member greater than said predetermined rotation difference in the slip condition when the engine operating condition is in a transient zone included in the fuel cut zone and adjacent to a fuel supply zone, said transient control means controlling the engaging force of the lock-up clutch means to produce a slippage therein greater than a slippage in said slip condition for a predetermined period whenever the engine operating condition moves from the fuel cut zone to the fuel supply zone regardless of a time period when the engine operating condition is in said transient zone, said predetermined period being increased as the rotation difference is decreased.

* * * * *